Oct. 26, 1965     W. P. KUSHMUK     3,213,985
OVERLOAD RELEASE CLUTCH FOR LIQUID METERING APPARATUS
Filed Feb. 2, 1962     2 Sheets-Sheet 1

INVENTOR.
Walter P. Kushmuk
BY
Fidler, Bradley & Bradley
Att'ys.

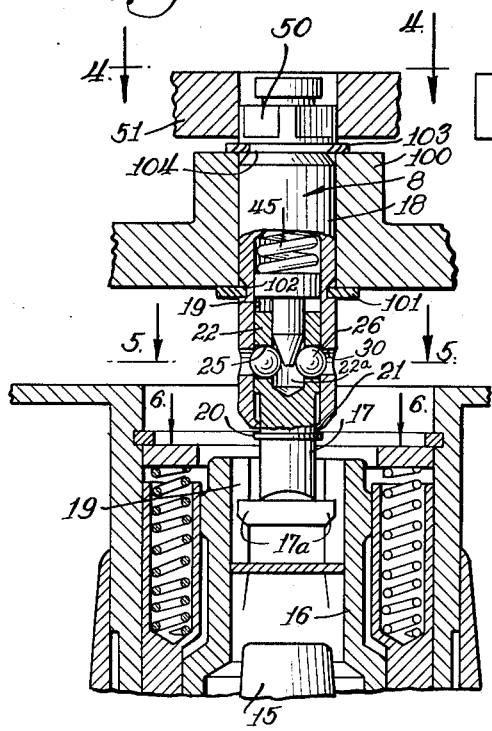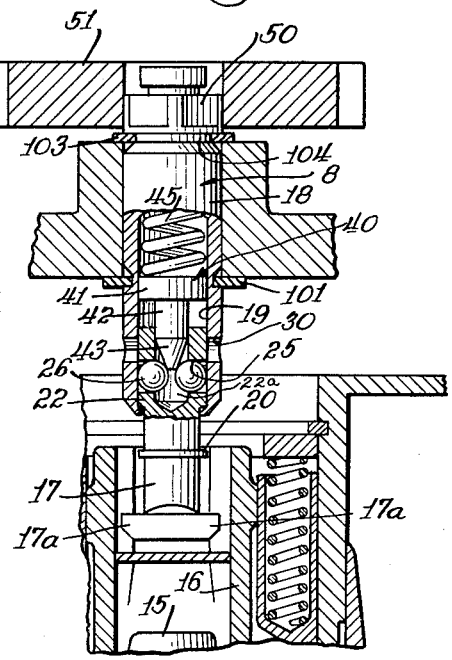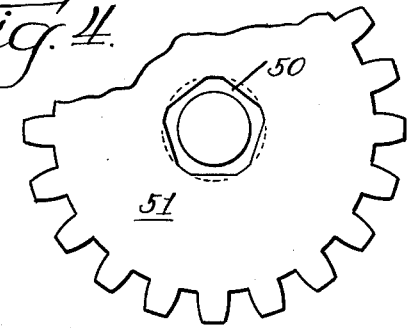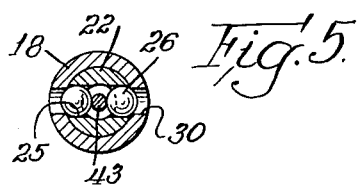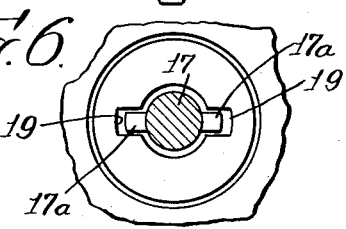

United States Patent Office 3,213,985
Patented Oct. 26, 1965

3,213,985
OVERLOAD RELEASE CLUTCH FOR LIQUID
METERING APPARATUS
Walter P. Kushmuk, Niles, Ill., assignor to Liquid Controls Corporation, North Chicago, Ill., a corporation of Illinois
Filed Feb. 2, 1962, Ser. No. 170,657
6 Claims. (Cl. 192—56)

This invention relates to apparatus for metering the flow of liquids and for registering the amount metered. It has to do more particularly with novel apparatus wherein means are provided for automatically disconnecting the register from the meter and for halting the register in the event that the register is jammed either accidentally or intentionally to cause it to be inoperative to register the true amount of liquid passing through the meter. The invention also relates to a novel breakaway drive which is automatically disconnected when the load therein exceeds a predetermined amount.

In dispensing liquids, as for example liquid fuels, it is common to provide a meter in the line for measuring the amount of liquid dispensed. Commonly a register or counter is connected to the meter which counts the revolutions of the meter and thus registers the quantity of liquid passing through the meter. Usually, such registers are provided with means for showing the total amount visibly. Furthermore, a recorder or printer is often connected to the register whereby a record of the amount of liquid appearing on the register may be printed on a record member such as a ticket or slip. It is known that unscrupulous persons have found ways of jamming the counter through the ticket slot of the printer so as to prevent actuation of the counter without halting the meter. Thus it is possible to effect the delivery of liquid through the meter without the amount being registered on the register.

The present invention provides apparatus for metering liquids wherein a drive is provided between the meter and the register which will automatically disconnect the register from the meter whenever the register is jammed, which drive can only be reconnected by a manual operation. Thus, upon any jamming of the counter, either accidentally or intentionally, the register will halt and will not thereafter operate and it will thereby become obvious that the amount of liquid metered is not being registered on the counter. The arrangement is such that the drive connecting the register and the meter can only be re-engaged by removing a portion of the apparatus to permit access to the interior, which removable portion can be secured against tampering by means of seals such as often used in connection with meters.

An object of the present invention is to provide new and improved apparatus for metering liquids and for registering the amount of liquid metered, wherein the register is disconnected from the meter automatically when the load thereon exceeds a predetermined value.

Another object is to provide novel apparatus for metering the flow of liquids and for registering the amount metered in which the register is automatically disconnected from the meter to halt the register upon accidental or intentional malfunctioning of the apparatus to thereby indicate such malfunctioning and in which the connection between the meter and register can only be re-established by manual resetting.

Still another object is to provide a novel breakaway drive suitable for use in the aforementioned apparatus or for other applications and wherein the driving and driven elements are connected by means which is disconnected whenever the load on the driven means exceeds a predetermined amount and which can only be reconnected by manual resetting.

A further object is to provide a drive including a driving member and a driven member connected by means which is automatically disconnected whenever the load connected to which the drive is connected, creates a torque on the drive exceeding a predetermined value which drive can only be reconnected by resetting the drive and cannot be reconnected by a normal operation of the drive.

Other objects and advantages of the invention will appear from the following description taken in connection with the appended drawings wherein, FIGURE 1 is a front elevational view partially in cross section of apparatus embodying the present invention;

FIG. 2 is an enlarged, fragmentary, sectional view showing the drive and connected elements, the drive being shown in normal driving position;

FIG. 3 is a view similar to FIG. 2 except that the drive is shown in its disconnected or uncoupled condition;

FIG. 4 is a transverse, sectional view taken along line 4—4 of FIG. 2;

FIG. 5 is a transverse, sectional view taken along line 5—5 of FIG. 2; and

FIG. 6 is a transverse, sectional view taken along line 6—6 of FIG. 2.

Figure 1:
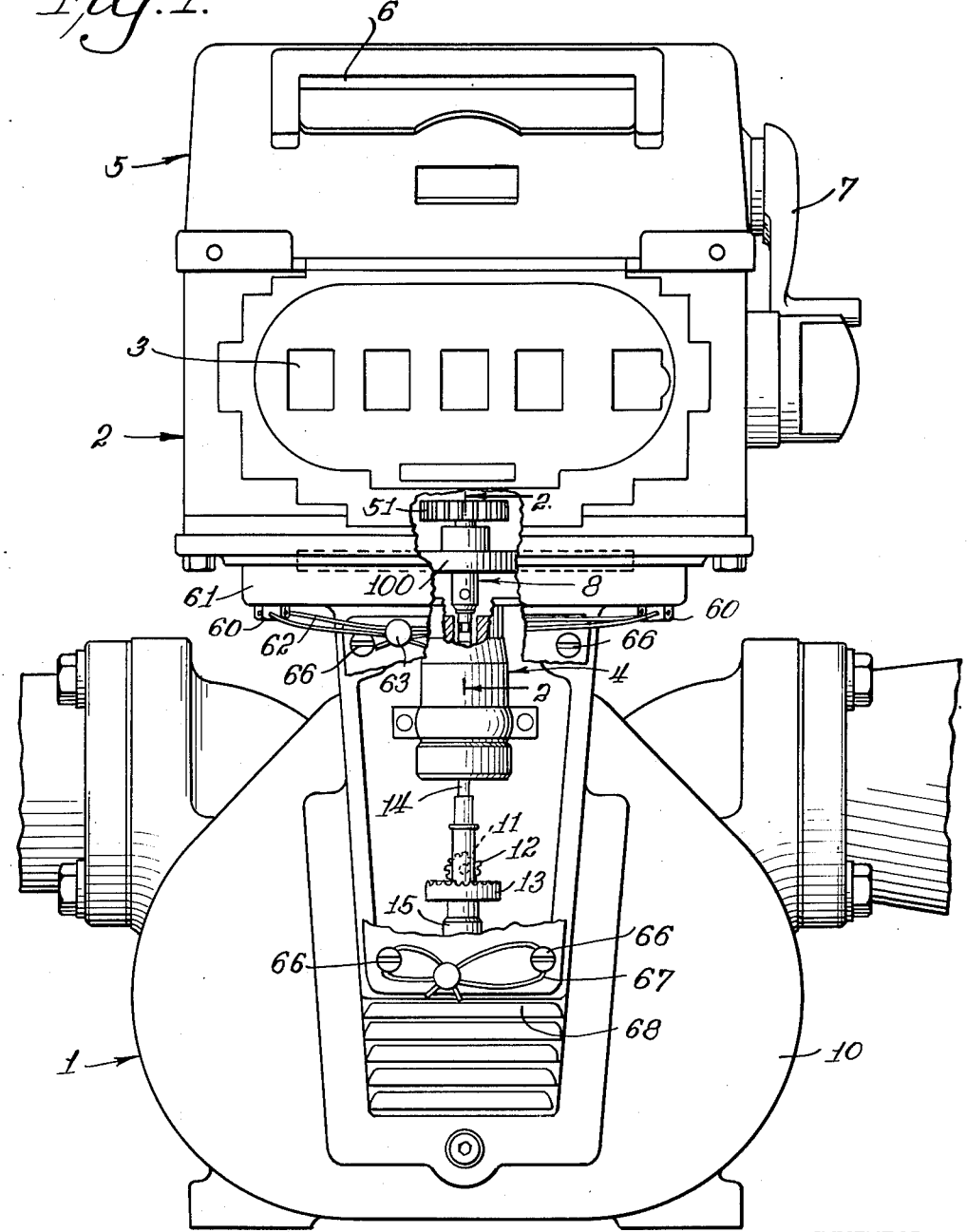

The apparatus includes a fluid meter 1 of the rotary positive displacement type such as shown, for example, in United States Patent No. 2,835,229 to George B. Richards. It will be understood, however, that any suitable type of rotary positive displacement meter may be employed, having a shaft connected to the rotary meter element and driven thereby in accordance with the rotation of the meter rotor which shaft projects from the meter casing or is otherwise adapted to be connected to a register.

The meter 1 is connected in driving relation to a register or counter 2 which may be of any suitable construction and may for example be a register or counter of the type hereinafter described. The counter is actuated by the rotation of the meter, through a connection hereinafter described, to rotate the counter wheels and display through the usual windows 3 a count corresponding to the number of revolutions of the meter. The counter preferably is constructed and calibrated to show in gallons the amount of fluid which has passed through the meter.

An adjuster 4 preferably is connected between the meter 1 and the counter 2 whereby the drive ratio between the meter and the counter may be adjusted to insure that the counter accurately registers the amount of liquid passing through the meter. The adjuster may be similar in construction to the adjuster disclosed in United States Patent No. 2,868,038 to H. R. Billeter.

It will be understood that such adjuster is not always required and may be omitted in certain circumstances.

A printer 5 is disposed on and connected to the counter 2 for printing on a ticket, card or other record member the total registered by the counter. Such printer may be of any suitable construction, suitable for operation with the register above mentioned. Preferably I use a combined register and pointer such as sold by Veeder-Root Incorporated of Hartford, Connecticut under the name Master Meter Duplicator model KD–LB (Series 151,800). As will be understood, the printer has a slot 6 into which the record member is inserted for printing the total thereon upon rotation of the handle 7.

Connected between the adjuster 4 and the register 2 is a breakaway coupling or drive 8 hereinafter described more in detail, the purpose of which is to disconnect the register 2 from the meter 1 in the event that the torque on the drive resulting from an excessive load imposed by the register 2 exceeds a predetermined value.

Projecting from the meter casing 10 is a shaft 11 which is driven by the meter and preferably the rotor (not shown) and which carries a pinion 12 driving a crown gear 13 which is carried on a shaft 14 journaled in a bearing 15 secured to the meter casing 10. The shaft 14 extends upwardly into the adjuster and is suitably connected in driving relation to an inner ball race 15 corresponding to the ball race (24) shown in the aforesaid Billeter Patent No. 2,868,038. The inner ball race 15 is connected in a manner similar to that shown in the said Billeter patent to a ball cage 16 corresponding to the ball cage (76) of the said patent. The ball cage 16 receives at its upper open end a shaft 17 which forms the driving shaft or driver of the breakaway drive and which shaft has a head provided with lugs 17a projecting radially therefrom and entering longitudinal slots 19 in the ball cage 16 in order to form a driving connection between the ball cage 16 and the driving shaft 17.

The driving shaft or driver 17 is slidably inserted at one end in a driven shaft 18, having a bore 19 providing an open end socket. The driven shaft also serves as a housing member as hereinafter described. The sliding movement of the driving shaft 17 in the driven shaft 18 is limited in one direction by a C-ring 20 secured on the driving shaft 17 and in the other direction by four stakes 21 on the open end of the driven shaft 18 which cooperate with an enlarged head or socket portion 22 on the driving shaft 17, which head is located within the socket 19.

The head or socket portion 22 is formed with a socket 22a and a plurality of circumferentially arranged bores or openings 25 extended radially through the wall of the socket portion 22 and open into the socket 22a. The openings 25 are located with their centers in a plane perpendicular to the longitudinal axis of the driving shaft 17.

Preferably two such openings are provided and are located at diametrically opposite points in the wall of the socket portion 22. Slidable radially in the openings 25 are coupling members in the form of balls 26 of a diameter preferably only slightly smaller than that of openings 25 whereby the balls may move radially inwardly and outwardly without undue friction but are held against movement in a direction parallel to the longitudinal axis of the driving shaft.

The driven shaft 18 is formed with a plurality of radial sockets or recesses 30 which are circumferentially arranged with their centers in a plane passing perpendicular to the longitudinal axis of the driven shaft 18. The sockets 30 each are positioned to receive respectively a portion of the corresponding ball 26 but are of a diameter somewhat less than the diameter of the ball so as to limit the extent of entry of the ball into the socket. For convenience the sockets 30 may be formed by circular openings or bores through the wall of the driven shaft 18. Two such recesses 30 are provided and they are diametrically opposite so as to be in register with the openings 25 when the driving and driven shaft are in appropriate positions relative to each other.

Slidable longitudinally in the socket 19 in the driven shaft 18 is a plunger 40 having an enlarged head portion 41 which guides the plunger for its movement, and a stem portion 42 having a conical end 43. The stem portion 42 is of a diameter to slide freely in the socket 19 of the driving shaft 17 and the conical end 43 is positioned to enter between the balls 26 and move them radially outwardly in the openings 25 as the plunger is moved outwardly in its socket (downwardly as viewed in FIG. 2). A spring 45 is disposed behind the plunger 40 and is compressed against the inner end (not shown) of the socket 19, whereby the spring constantly applies a force on the plunger 40 tending to urge it in an outward direction. Thus it will be seen that the inclined end 43 of the plunger 40 is constantly urged in a direction to exert an outward force on the balls at all times tending to urge them radially outwardly.

The taper of the end of the plunger is selected so as to provide the desired disconnecting or breakaway action when the device is operated as hereinafter explained and may range through a considerable extent. However, I have found that excellent results are obtained by making the taper such that the surface of the tapered portion extends at an angle of between approximately 15° and approximately 20° relative to the axis of the stem portion 42. It will be understood that the extent of the taper determines the torque at which the balls will be moved inwardly to cause the breakaway action to take place as will be understood from the description of the operation hereinafter appearing.

The driven shaft 18 projects upwardly through a gear plate 100 forming a portion of the register and has a head 50 of pentagonal shape which is inserted in a drive pinion 51 which forms a part of the register and drives the register mechanism (not shown). The C-rings 101 and 102 engage grooves 103 and 104 in the driven shaft to retain it in position in the gear plate 100.

It will be understood at this point that in many cases it is desirable to provide between the meter 10 and the visible register 2 a preset counter whereby the visible register may be set to actuate a mechanism (not shown) for halting the flow of liquid when a predetermined quantity of liquid has passed through the meter and caused a corresponding actuation of the visible register. Where such a preset counter is provided the driven shaft 18 is made of sufficient length so that it extends from the adjuster 4 and through the preset counter and into the visible register 2 for connection thereto as herein shown and described. It will be understood that in such cases the preset counter is driven by the visible register and not directly by the meter and therefore there is no necessity for any connection between the breakaway drive and the preset counter.

In the operation of the device, the meter is connected in a liquid transmission line (not shown) in the usual manner and liquid caused to flow therethrough and to thereby rotate the meter. Thus the shaft 11 is rotated to drive the shaft 14, through the pinion 12 and crown gear 13 which rotate the inner ball race 15 to thereby drive the ball cage 16 and rotate the driving shaft 17. Assuming that the breakaway drive is set for the driving operation, the balls 26 are urged outwardly in their respective openings 25 and partially into the slots 30 in the driven shaft 18. This action results from the fact that the spring 45 urges the piston 40 outwardly and forces the tapered end 43 between the balls 26 thus urging them outwardly. The balls 26 thus serve to connect the driven shaft 18 to the driving shaft 17 for simultaneous rotation about the common axes of such shaft.

Should excessive torque be placed on the driven shaft 18, as for example should the visible register be jammed for any reason, the reaction of the edges of the recesses 30 against the balls urges the balls inwardly thereby forcing the plunger 40 inwardly (upwardly as viewed in FIG. 2) against the force of the spring 45. Should the torque be sufficient the balls are moved inwardly clear of the recesses 30 whereupon the spring 45 will move the plunger outwardly (downwardly) thereby moving the driving shaft 17 downwardly, such latter action being permitted by reason of the lug and slot connection between the driving shaft 17 and the ball cage 16. The spring 45 will maintain the plunger 40 and the driving shaft 17 in their lower positions and the balls will not thereafter re-enter the slots 30 to again establish the connection between the driving shaft 17 and the driven shaft 18 unless and until the driving shaft 17 is moved upwardly into a position wherein the balls 26 register with and enter the recesses 30. Thus the connection between the shafts 17 and 18 will not be re-established merely by release of the excessive torque or in the fact of any further rotation of the driving shaft, but only by upward movement of the driving shaft 17 which normally can only be effected manually.

In order to prevent unauthorized resetting of the breakaway drive the same is enclosed within a portion of the meter casing 10 and the casing of the visible register 2 which casings are secured together by screws 60 passed through the upper portion 61 of the meter housing and threaded into the visible register housing. The screws are sealed against removal by a wire 62 passed through bores in the screw heads and having its ends joined by a seal 63. Thus the visible register cannot be removed from the meter casing without first breaking the seal 63 which, of course, would provide visible evidence of tampering with the mechanism.

A cover plate 65 is secured over the end of the meter casing in order to permit access to the adjuster 4 which cover plate is secured in place by screws 66 and is sealed by means of a wire 67 passing through the lower screws 66 and ball by a seal 68. Thus unauthorized entry into the interior of the meter casing is prevented thereby preventing access to the breakaway drive.

It will be seen from the foregoing that the present invention provides a novel and effective breakaway drive which automatically serves to disconnect a driving shaft from a driven shaft and to maintain the shafts thus disconnected until the mechanism is reset by moving the shafts in a longitudinal direction relatively to each other which operation normally is effected manually. It will also be seen that the connection cannot be re-established by any action other than the longitudinal relative movement of the shafts. Particularly, the connection is not re-established when the excessive torque which caused the uncoupling to occur is relieved. Neither is the connection re-established by further rotation of the driving shaft. Additionally, it will be seen that no replacement of parts is necessary, as for example the replacement of a shear pin such as commonly used in other types of breakaway drives.

It will be understood that while the breakaway drive of the present invention has been disclosed in connection with its application in driving a visible register from a meter, the invention is not limited to such use and the drive may be used in other applications where such a drive is applicable.

I claim:

1. A releasable drive comprising a first rotatable member having a socket in one end, a second rotatable member slidable axially in said socket, coupling means including a coupling element carried by said second member and axially slidable therewith, and movable into coupling engagement with said first member when said second member is in a predetermined position axially relative to said first member, for coupling said first and second members together for simultaneous rotation, a plunger slidable in said socket and engageable with said coupling element for urging it into coupling engagement with said first member and spring means urging said plunger toward said second member to thereby yieldably maintain said coupling element in coupling engagement with said first member when said second member is in said predetermined position and to urge and yieldably maintain said second member axially out of said predetermined position when said coupling element is moved out of said coupling position.

2. A releasable drive comprising a first rotatable member having a socket in one end, a second rotatable member slidable axially in said socket and having a recess opening into said socket, coupling means including a coupling element carried by said second member and axially slidable therewith and movable in said recess and into coupling engagement with said first member when said second member is in a predetermined position axially relative to said first member, for coupling said first and second members together for simultaneous rotation, a plunger slidable in said socket and engageable with said coupling element for urging it into said recess in coupling engagement with said first member and spring means for urging said plunger toward said second member to thereby yieldably maintain said coupling element in said recess in coupling engagement with said first member when said second member is in said predetermined position, and to urge and yieldably maintaining said second member axially out of said predetermined position when said coupling element is moved out of said coupling position.

3. A releasable drive as set forth in claim 2, wherein a plurality of said coupling elements are provided which are spaced circumferentially about said second rotatable member.

4. A releasable drive comprising a rotatable first member having a first longitudinal socket in one end thereof and a plurality of circumferentially arranged radial sockets opening into said first longitudinal socket, a rotatable second member having a second longitudinal socket in one end thereof and a plurality of circumferentially arranged radial openings opening into said second longitudinal socket, said second member having its said end slidable in the longitudinal socket in said first member into and out of a position wherein the openings in said second member register with the radial sockets in said first member, a plurality of coupling balls carried by said second member and slidable therewith and movable radially in the radial openings in said second member and adapted to partially enter said radial sockets to couple said first and second members together, a plunger slidable in the longitudinal socket in said first member and having a tapered end positioned to enter the socket in said second member and between said balls and move said balls radially upon movement of said plunger inwardly in the socket in said second member, and means yieldably urging said plunger toward said second rotatable member to thereby urge said coupling members radially into the radial sockets in said first member when said sockets are in registry with said openings and to urge said second rotatable member in a longitudinally outward direction in the longitudinal socket in said first member when said coupling members are displaced from said radial sockets and yieldably maintain said second rotatable member out of said position wherein said radial sockets are in registry with said openings.

5. A releasable drive comprising a rotatable first member having a first longitudinal socket in one end thereof and a plurality of circumferentially arranged radial sockets opening into said first longitudinal socket and having their centers in a plane perpendicular to the axis of said first member, a rotatable second member having a second longitudinal socket in one end thereof and a plurality of circumferentially arranged radial openings opening into said socket and having their centers in a plane perpendicular to the axis of said member, said second member having its said end slidable in the longitudinal socket in said first member with the openings therein positioned to register with the radial sockets in said first member, a plurality of balls carried by said second member and slidable therewith and movable radially in the radial openings in said second member and adapted to partially enter said radial sockets to couple said first and second members together, a plunger slidable in the longitudinal socket in said first member and having a tapered end positioned to enter the socket in said second member and between said balls and thus move said balls radially upon movement of said plunger inwardly in the socket in said second member, and means yieldably urging said plunger toward said second rotatable member to thereby urge said balls radially into the radial sockets in said first member when said radial sockets are in registry with said openings and to urge said second rotatable member in a longitudinally outward direction in the longitudinal socket in said first member when said balls are displaced from said radial sockets and yieldably maintain said second rotatable member out of said position wherein said radial sockets are in registry with said opening.

6. A breakaway drive which is automatically disconnected when the load thereon exceeds a predetermined amount, comprising:

a driving shaft having a longitudinal socket in one end thereof;

said driving shaft having spaced transverse bores connecting the exterior of said shaft to said longitudinal socket;

a driven shaft having a longitudinal socket in one end thereof;

said driven shaft having spaced transverse sockets connecting the exterior of said driven shaft to the longitudinal socket in said driven shaft;

the end of said driving shaft having said longitudinal socket therein being rotatably mounted within the longitudinal socket in said driven shaft and being longitudinally movable therein to a first position where said bores and said transverse sockets are in mutual alignment and to a second position where said bores and said transverse sockets are out of alignment;

coupling balls mounted in said spaced bores in said driving shaft, said coupling balls being sized to move freely in said bores and sized too large to pass through said transverse sockets in said driven shaft;

piston means having a concial end;

said piston means being reciprocally mounted within the longitudinal sockets in said driving and driven shafts; with the conical end of said piston in said driving shaft;

spring means operatively interconnected between said driven shaft and said piston means and urging said piston means toward said driving shaft to force the concial end of said piston means between said coupling balls to urge said coupling balls toward the exterior of said driving shaft and partially into said transverse sockets in said driven shaft to thereby couple said driving and driven shafts against rotational and longitudinal motion relative to each other;

whereby in operation a torque on said driven shaft exerting an inward force on said balls in excess of the force exerted thereon by said spring-biased piston means causes said coupling balls to be moved into said driving shaft out of said transverse sockets thereby breaking the drive connection between said shafts and allowing said spring-biased piston means to move and maintain said shafts into said second position wherein said bores and said transverse sockets are out of alignment.

References Cited by the Examiner

UNITED STATES PATENTS

| | | | |
|---|---|---|---|
| 1,512,760 | 10/24 | Hancock | 192—56 |
| 1,593,732 | 7/26 | Street | 192—56 |
| 1,725,562 | 8/29 | Borchert | 192—56 |
| 1,853,835 | 4/32 | Peltz et al. | 192—56 |
| 1,936,665 | 11/33 | Gauthier. | |
| 2,006,913 | 7/35 | Conley | 192—56 |
| 2,191,154 | 2/40 | Hazard | 222—27 |
| 2,313,708 | 3/43 | Waller | 192—56 |
| 2,464,590 | 3/49 | Landahl | 192—56 |
| 2,837,190 | 6/58 | Blakeslee | 192—56 |
| 3,115,230 | 12/63 | Creighton et al. | 192—56 |

DAVID J. WILLIAMOWSKY, *Primary Examiner.*